(12) United States Patent
Poplack et al.

(10) Patent No.: US 10,509,877 B1
(45) Date of Patent: Dec. 17, 2019

(54) SYSTEMS AND METHODS FOR REDUCING LATENCY WHEN TRANSFERRING I/O BETWEEN AN EMULATOR AND TARGET DEVICE

(71) Applicant: CADENCE DESIGN SYSTEMS, INC., San Jose, CA (US)

(72) Inventors: Mitchell G. Poplack, San Jose, CA (US); Viktor Salitrennik, San Jose, CA (US); Gavin Zawalski, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 497 days.

(21) Appl. No.: 15/374,508

(22) Filed: Dec. 9, 2016

(51) Int. Cl.
  *G06F 9/455* (2018.01)
  *G06F 17/50* (2006.01)
(52) U.S. Cl.
  CPC ...... *G06F 17/5022* (2013.01); *G06F 17/5027* (2013.01)
(58) Field of Classification Search
  CPC .................................................. G06F 17/5022

USPC ........................................................... 703/26
See application file for complete search history.

(56) References Cited

U.S. PATENT DOCUMENTS 10,198,538 B1 * 2/2019 Quayle ............... G06F 17/5027

* cited by examiner

*Primary Examiner* — Hugh M Jones
(74) *Attorney, Agent, or Firm* — Eric L. Sophir; Dentons US LLP

(57) ABSTRACT

Systems, methods, and products having pipelined inputs to and outputs from an emulator are disclosed. Using a pipeline may allow the round trip cable delay (RTCD) to be spread across two or more clock cycles. In an embodiment, an emulation system may store input data received from a target device during a first clock cycle at a target timing domain interfacing component (TTD), and transmit the stored input data during a second clock cycle after the first clock cycle. In another embodiment, the emulation system may delay transmitting the input data received at the TTD during the first clock cycle such that that the input data reaches the emulator at a predetermined time during the second clock cycle. As the RTCD is spread across multiple clock cycles, the emulation system may implement faster clocks.

20 Claims, 3 Drawing Sheets

SYSTEMS AND METHODS FOR REDUCING LATENCY WHEN TRANSFERRING I/O BETWEEN AN EMULATOR AND TARGET DEVICE

TECHNICAL FIELD

This application relates generally to integrated circuit (IC) testing and verification systems, methods, and products, and more specifically to systems, methods, and products for reducing latency when transferring data between an emulator and a target device.

BACKGROUND

Emulation systems may comprise hardware components, such as emulation chips and processors, capable of processor-based (e.g., hardware-based) emulation of logic systems, such as integrated circuits (ICs), application specific integrated circuits (ASICs), central processing units (CPUs), graphics processing units (GPU), field-programmable gate arrays (FPGAs), and the like. By executing various forms of programmable logic, the emulation chips may be programmed to mimic the functionality of nearly any logic system design that is undergoing testing and verification. Processor-based emulation allows logic system designers to prototype a logic system's design, before a manufacturer expends resources manufacturing a logic system product based on the design.

An emulation system may be connected to a target device, wherein the target device may aid the testing and verifying the logic being emulated in the emulation system. For example, if the emulation system is emulating a graphic processing unit (GPU), the target device may be a motherboard configured to receive the GPU once the GPU has been fabricated. For testing and verifying the logic being emulated, the target device may provide inputs to and receive outputs from the emulation system. For example, in the case of the GPU being emulated, the motherboard may include devices that receive outputs from the GPU and send inputs to the GPU.

The emulation system and the target device may be interconnected using a cable, which introduces a round trip cable delay (RTCD). RTCD, from the emulation system perspective, may be defined as the sum total of the time taken by an output data or signal down the cable to the target device added to the time taken by an input data or signal up the cable from the target device to the emulation system. In addition to the RTCD, the target device may introduce a delay for the time required to receive the output from the emulation system, process the output to generate the input to the emulation system corresponding to the output, and transmit the input signal to the emulation system. Therefore, the emulation system may see a total delay of RTCD and the delay added by the target device. To account for these delays, the cycle of the interface clock—used to control the output from and input to the emulation system—may have to be made longer. More specifically, the interface clock cycle may have to be at least as long as the RTCD added to the delay caused by the target device. A longer clock cycle may translate to a lower frequency and therefore a slower emulation system.

SUMMARY

Therefore, there is a need for an emulation system having a relatively short clock-cycle and yet taking into account the RTCD and the delay imposed by the target device. Systems and methods described herein attempt to solve the aforementioned and other problems by spreading a long RTCD across multiple clock cycles such the latency from the perspective of an emulator device is reduced and such that a faster clock with shorter clock cycles may be implemented. In particular, the system and methods described herein implement a pipeline approach to temporarily store data or delay transmitting data across emulation cycles.

In one embodiment, a method for emulating hardware logic comprises: receiving, by a set of one or more chips of an emulation system, an input data for an emulator from a target device during a first clock cycle, wherein the set of one or more chips defines a target timing domain interfacing component (TTD); storing, by the set of one or more chips of the TTD, the input data in a non-transitory storage medium; receiving, by the set of one or more chips of the TTD, the triggering edge of a second clock cycle, wherein the second clock cycle is after the first clock cycle; and transmitting, by the set of one more chips of the TTD, the input data to the emulator in response to receiving the triggering edge of the second clock cycle.

In another embodiment, a method for emulating hardware logic comprises: receiving, by a set of one or more chips of an emulation system, an output data for a target device from an emulator during a first clock cycle, wherein the set of one or more chips defines a target timing domain interfacing component (TTD); transmitting, by the set of one or more chips of the TTD, the output data to the target device; receiving, by the set of one or more chips of the TTD, from the target device an input data for the emulator generated by the target in response to the input data; and transmitting, by the set of one or more chips of the TTD, the input data after a delay such that the emulator receives the input data during a predetermined time during a second clock cycle, wherein the second clock cycle is after the first clock cycle.

In yet another embodiment, a system for emulating hardware logic comprises: a plurality of processors, at least a portion of plurality of processors configured to emulate hardware logic of a device under test (DUT); and a set of one or more chips defining a target timing domain interfacing component (TTD), the TTD configured to: receive an output data for a target device from the emulator; transmit the output data to the target device; receive an input data for the emulator generated by the target device in response to the output data; store the input data in a first-in first-out (FIFO) queue; and transmit the input data to the emulator after a delay or in response to receiving a triggering edge of a clock cycle from the emulator.

BRIEF DESCRIPTION OF THE DRAWINGS

The accompanying drawings constitute a part of this specification and illustrate embodiments of the subject matter disclosed herein.

DETAILED DESCRIPTION

Figure 1:
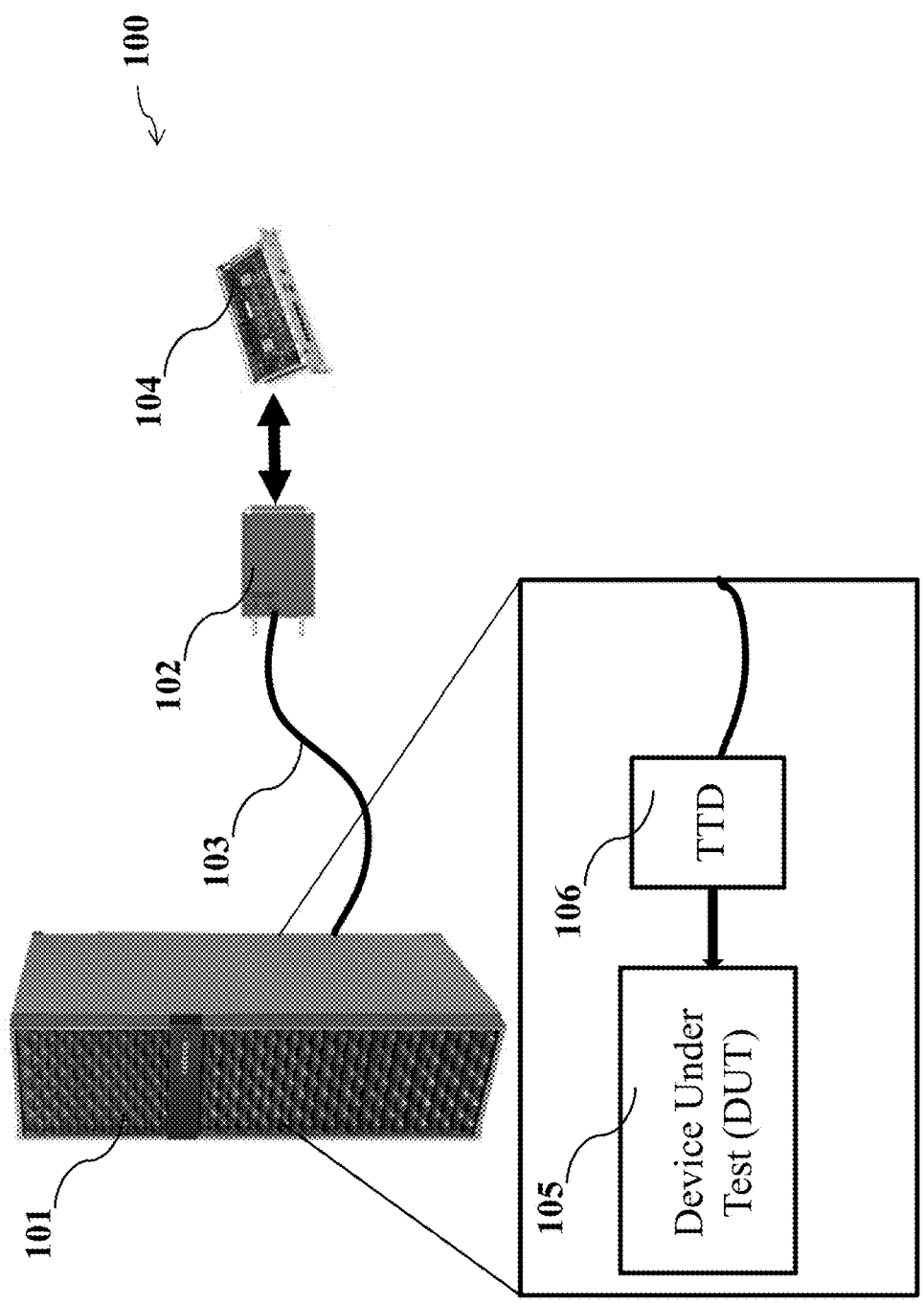
FIG. 1 illustrates an exemplary emulation system, according to an exemplary embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

An emulation system may comprise components such as processors, memory components, storage components, data buses, and clock sources and may be arranged and described in any layer of granularity and abstraction. For example, the emulation system may be described as containing numerous domains, each domain emulating a certain logic. The logic being emulated in a single domain may be an entirety of a chip or system that is being tested and verified in the emulation system. Alternatively, the logic being emulated in a single domain may be a portion of a chip or system that is being testing and verified. For brevity, this specification describes a Device Under Test (DUT), which may be a chip or system, or a portion thereof that is being tested and verified. The DUT may include a single domain or multiple domains. For the testing and verification, the DUT may transmit output signals to a target device and receive input signals from the target device. The input and output signals may contain control signals and/or data.

An optical interconnect and a target pod may replace wide parallel cables connecting the emulation system with the target device. One end of the optical interconnect may be connected to the emulation system and another end may be connected to the target pod. The target pod may provide an interface for a target device to be connected to the emulation system. For example, the target pod may contain a plurality of pins which may interact with a corresponding plurality of slots at the target device. The target pod may receive signals from the DUT (within the emulation system, as described above) and process the signals, for example multiplex and/or demultiplex the signals from the DUT, to provide the signals to the target device. The target pod may further receive signals from target device and transmit the signals from the target device to the DUT.

An interface clock may control the outputs from the DUT to the target device and the inputs from the target device to the DUT. For example, the outputs may be transmitted by the DUT at a triggering edge of the interface clock. Furthermore, the inputs from the target device to the DUT may be read by the DUT at the triggering edge of the interface clock. The interface clock may be one of the internal clock of the emulation system. In some embodiments, the interface clock may be synchronized with the base clock of the emulation system.

The optical interconnect between the emulation system and the target device may cause a round trip cable delay (RTCD). To accommodate for the RTCD and the delay inserted by the target device, the clock cycle of the interface clock may have to be made longer. At the very least, the clock cycle of the interface may have to be made long enough to accommodate for the RTCD and the delay caused by the target device. For example if the RTCD is 20 nanoseconds (ns) and the delay inserted by the target is 10 ns, the clock cycle of the interface clock may have to be at least 30 ns.

However, the DUT may not require an input from a target device in the same clock cycle the DUT transmits an output to the target device. For example, the DUT may transmit a request signal for an input data but may not require the input data until a few cycles later. For instance, the input data may follow a serial protocol, and the DUT may cumulatively store the serialized input data with no bearing on the output to the target device during the next few clock cycles. It may therefore be not be necessary for the DUT to receive the requested data in the same clock cycle that the DUT transmits the data request to the target device. In other words, an emulation cycle may be considered a sequence of steps of transmitting the output to the target device, the target device processing the output to generate the input to the DUT, and the target device transmitting the output to the DUT, which may not have to be accomplished in a single clock cycle. As such, the input data may be delayed such that the input data may be provided in subsequent clock cycles. For example, the emulation system may temporarily store the received data in a memory, for instance using a first-in first-out (FIFO) queue to be retrieved by the DUT in the subsequent clock cycles. In some embodiments, the memory may be within the emulation system and may comprise one or more domains in the emulation system. In other embodiments, the memory may be inserted in one or more locations of the optical interconnect. The memory may be spatially closer to the DUT (and the emulation system) than the target device. The memory may be incorporated into an emulation system component referred to as a target timing domain interfacing component (TTD), which controls the timing of the input data being sent to the emulation system (or the DUT) and the output data being sent by the emulation system (or the DUT). The TTD may include a set of one or more chips, such as memory chips and processor chips.

In some implementations, the TTD may store the input data received from the target device during a first clock cycle. The TTD may then receive the triggering edge of the second clock cycle. Upon receiving the triggering edge of the second clock cycle, the TTD may transmit the input data received at the first clock cycle to the emulator (and the DUT). As the input data is stored in a memory in the TTD closer to the emulator (and the DUT), the DUT can retrieve the input data with reduced latency. For instance, if a data takes 10 ns to travel through the optical interconnect, i.e. the RTCD of the optical interconnect is 20 ns, the time taken by the data to travel from the TTD to the DUT may be 5 ns, i.e. the latency between the request sent and the data received may be 10 ns. As such, the DUT may experience a latency significantly less than the RTCD. Furthermore, as the triggering edge of the clock controls the release of the stored input data by the TTD, the emulation may be temporarily stopped without a loss of the input data. In other words, the TTD may store the input data until the triggering edge of the second clock cycle is received regardless of the time elapsed between the TTD storing the input data and the TTD receiving the triggering edge of the clock. Therefore, if the emulation is stopped before the TTD receives the triggering edge of the second clock cycle, the input data may remain stored in the TTD.

In some implementations, the TTD may delay transmitting the input data to the emulator. The TTD may receive during a first clock cycle an output data for the target device from the emulator. The TTD may transmit the output data to the target device and may receive the input data corresponding the to the output data within the first clock cycle. Upon receiving the input data, the TTD may not transmit the input data to the emulator immediately, but rather delay transmitting the data. The delay may be adjustable, and the TTD may adjust or select the delay such that the input data reaches the emulator at the predetermined time during a second clock cycle following the first clock cycle. For example, the input data, although a clock cycle old being from the first clock cycle, may arrive at the emulator early during the second clock cycle. Therefore, the emulator may experience just the analogue delay of transmitting the data from the TTD to the emulator, and may not see the digital delay of one clock cycle. The analogue delay may be significantly less than the RTCD of the cable. Furthermore, the TTD can adjust the delay such that the input data shows up at the emulator at the very beginning of the second clock cycle. In this case, the emulator would not experience a delay (zero delay) of the transmission from the TTD to the emulator. Therefore, the delay of transmitting data from the TTD to the emulator may be tuned out.

One ordinarily skilled in the art should appreciate that as the RTCD may be spread across multiple clock cycles, the duration of one or more clock cycles in the emulation system may be made shorter, that is, the one or more clocks in the emulation system may be made faster.

FIG. 1 shows an exemplary emulation system 100, according to an exemplary embodiment. The emulation system 100 may comprise any number of emulation devices 101 that are configured to emulate logic systems, e.g., application specific integrated circuit (ASIC), field programmable gate array (FPGA), graphics processing unit (GPU), central processing unit (CPU), in order to test and verify the design of those logic systems. The emulation system 100 may further comprise any number of target pods 102 connected by one or more interconnecting cables 103. The target pods 102 may interface with one or more target devices 104. Although the exemplary emulation system 100 may include multiple emulation devices 101, target pods 102, target devices 104, and interconnecting cables 103, these components are described below in a singular form for brevity.

FIG. 1 illustrates relationships between various components of system 100, including the emulator device 101, the target pod 102, and the target device 104 as being physically and logically organized into one or more cabinets or housings. However, it should be appreciated that there is no requirement for any components of an emulation system 100 to be logically or physically organized into such containers. Rather, the components of the emulation system 100 may be logically and physically organized within the same or different devices or structures, and may be distributed across any number of physical structures and locations (e.g., cabinets, rooms, buildings, cities). Furthermore, it should be appreciated that there is no requirement one or more interconnecting cables 103 to be a single, continuous cable. Rather, the interconnecting cables 103 may include various wired and wireless communication channels to transfer data to and from the one or more emulator devices 101.

Emulator device 101 may be devices of the emulation system 100 responsible for compiling and executing emulation routines. Non-limiting examples of the emulation device 101 may include emulation chips, logic boards, data buses, wiring interfaces, data lanes, non-transitory machine-readable media, and processors, among others. The emulator device 101, such as emulation chips, may be programmed to process data inputs and generate data outputs according to instructions generated by compiling a schematic design ("netlist") of a particular logic system. A processor of the emulation system 100 may compile a machine-readable netlist file into executable code, which is then distributed as instruction sets to one or more emulation chips of the system. In some embodiments, the processor of the emulation system 100 may compile hardware specification described in a hardware description language such as VHDL or Verilog to generate the instruction sets. For each of the components of the system 100 receiving an instruction set, the instructions may indicate which other component of the system 100 is the source of a particular component's next data input, and which other component of the system 100 is the destination of the particular component's next data output.

The emulator device 101 may be logically organized into domains, which are subsets of the emulation device 101 allocated to execute a particular emulation. Domains may be the smallest unit of hardware resources of the emulator device 101 that the emulation system 100 is capable of allocating to emulate a logic system design associated with the target device 104. Each domain may comprise one or more emulation devices 101 allocated by a configuration module to execute a particular emulation routines while interacting with the target device 104. A domain (e.g., set of hardware resources) may be configured with execution parameters independent from both other domains and the rest of an emulation system 100 as whole. For example, each domain may comprise a separate execution clock that is independent from a system clock, and thus the domain may be independently schedulable from a user's perspective. It should be appreciated that a domain may be defined at any level of granularity within the emulation system 100, and may comprise any collection of hardware resources of the emulation system 100. Non-limiting examples of what constitutes a domain may include: one or more emulation chips, one or more processors on emulation chips, logical circuit boards, clusters of logical circuit boards, and any other collection hardware components that may be allocated to execute according to an independent clock. One ordinarily skilled in the art should appreciate the aforementioned complexity and other structural and functional complexity of the emulator device 101. However, for brevity, this disclosure describes two components, device under test (DUT) 105 and target timing domain interfacing component (TTD) 106 within the emulator device 101. The DUT 105 and TTD 106 may be implemented at any layer of abstraction within the emulator device 101.

The DUT 105 may be the logic being emulated in the emulator devices 101. For example, the DUT 105 may comprise logic for components such as CPU, GPU, ASIC, FPGA. The DUT 105 may send outputs to and receives inputs from the target pod 102, which in turn interfaces with target device 104 to provide the outputs to the target device 104 and receive inputs from the target device 104. The DUT 105 may contain one or more aforementioned domains. The TTD 106 may also contain one or more aforementioned domains. The TTD 106 may be used to control the timing of the outputs from the DUT 105 to the target pod 102 (and consequently to the target device 104) and the inputs from the target pod 102 to the DUT 105. For example, the TTD 106 may temporarily store inputs from the target device 104 and provide the stored inputs to the DUT 105 at a predetermined time. The TTD 106 may include a set of one or more chips, such as memory chips and processor chips. In some embodiments, the TTD 106 may include a field programmable gate array (FPGA) to receive and store the input and/or input data. The FPGA may include both synchronous and asynchronous logic devices. For example, the FPGA may include combinational logic gates and memory registers. FPGAs are known in the art and will not be described in detail here. Furthermore, the FPGA is merely exemplary, and any device capable of receiving and providing storage and retrieval of data should be considered to be within the scope of this disclosure. In some embodiments, the emulation system may use a first-in first-out (FIFO) queue to receive and store the input and/or output data.

The target pod 102 may be used to interface with the target device 104. The target pod 102 may receive output data from the emulator devices 101, multiplex/demultiplex and/or buffer the received output data, and provide the output data to the target device 104. The target pod 102 may comprise a processor that executes one or more software programs and/or non-transitory machine-readable storage media that stores data inputs and outputs. It should be appreciated that a target pod 102 may be a distinct, stand-alone device, as shown in FIG. 1, but a target pod 102 may also be integrated into another computing device that is in communication with various other components of the emulation system 100. The target pod 102 may include interface components to connect to the corresponding interface components of the target device 104. For example, the target pod 102 may plug directly into the target device 104, through any number of ports of the target device 104 (e.g., USB, Serial, PCI); or the target pod 102 may be connected indirectly to the target device 104 via one or more connector adapters, data processors, network devices, or other electronic communications devices.

The target device 104 may include any type of hardware and/or software components configured to interact with the logic design that is being emulated by the emulation device 101. For instance, the target device 104 may include logic components configured to connect with the design being emulated once the design tapes out. For example, if the design being emulated is a CPU, the target device may be a motherboard configured to receive the CPU being emulated. If the design being emulated is a GPU, the target device may include component configured to interact with the GPU, for example an user interface to be driven by the GPU. In operation, the target device 104 may provide input signals to the emulator 101. In some instances, the target device 104 may generate test signals as input signals to drive a specific behavior of the DUT 105. The target device 104 may test the specific behavior of the DUT 105 based on an output signal generated by the DUT 105. In some instances, the target device 104 may generate input signals in response to receiving output signals from the DUT 105. The input and output signals may include information such as data records, control signals, and clock signals.

Figure 2:
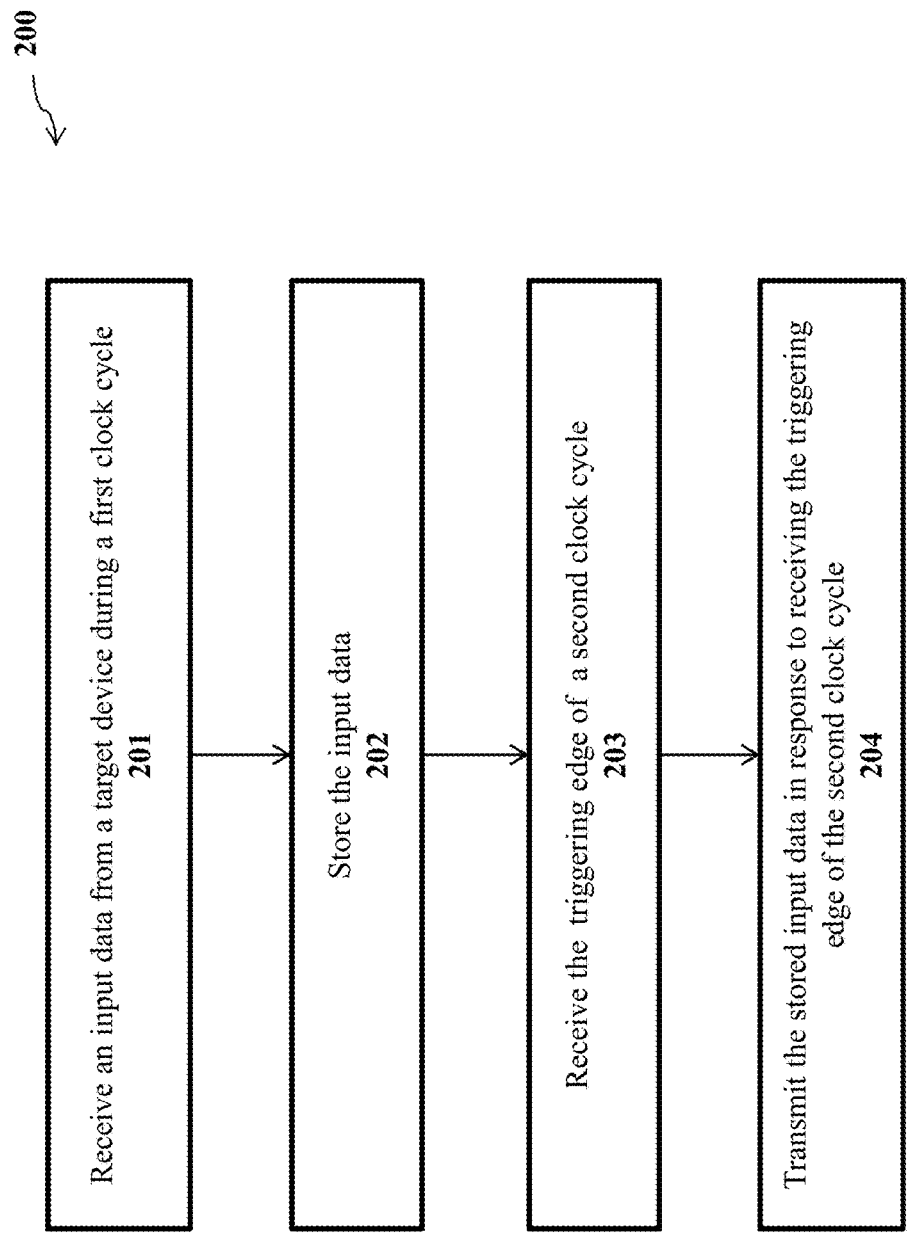
FIG. 2 illustrates an exemplary emulation method, according to an exemplary embodiment.

FIG. 2 shows an exemplary method 200 of reducing latency in an emulation system, according to an exemplary embodiment. One or more components within an emulation system may implement one or more steps of the method 200. However, for brevity, the following description details an emulation system implementing the method 200. The emulation system may contain an emulator that may interface with a target device through one or more connections such as an optical interconnect. The target device may transmit data to and receive data from a device under test (DUT) within the emulator. The target device may include one or more components that are configured to be connected to and interact with the DUT. For example, if the DUT is a central processing unit (CPU), the target device may be a motherboard that will receive the fabricated CPU containing the logic being emulated by the emulator. In the following description, the data transmitted by the target device to the emulator is referred as an input data and the data transmitted by the emulator to the target device is referred to as an output data.

In the first step 201, the emulation system may receive an input data from the target device during a first clock cycle. In some instances, the first clock cycle may be a clock cycle of an interface clock of the emulation system. The interface clock may be used by the emulation system to transmit outputs to and receive inputs from the target device. In other instances, the first clock cycle may be a clock cycle of a clock among one or more internal clocks of the emulation system. In some instances, the input data may be generated by the target device in response to receiving an output data from the emulation system. In some instances, the input data may be generated by the target device to drive a behavior of the DUT in the emulation system.

The emulation system may use a target timing domain interfacing component (TTD) field programmable gate array (FPGA) to receive and store the input data. A TTD FPGA may include both synchronous and asynchronous logic devices. For example, a TTD FPGA may include combinational logic gates and memory registers. FPGAs are known in the art and will not be described in detail here. Furthermore, the TTD FPGA is merely exemplary, and any device capable of receiving and providing storage and retrieval of data should be considered to be within the scope of this disclosure. In some embodiments, the emulation system may use a first-in first-out (FIFO) queue to receive and store the input data.

In a next step 202, the emulation may store the received input data. As described above, the emulation system may store the data using a FIFO queue. Furthermore, the emulation system may store the input data in a TTD FPGA or any other kind of memory device. The emulation may store the received input data within the first clock cycle.

In a next step 203, the emulation system may receive the triggering edge of a second clock cycle. The second clock cycle may be a clock cycle immediately following the first clock cycle. Depending upon the design of the emulation system, the triggering edge may be the rising edge or the falling edge of the second clock cycle.

In a next step 204, the emulation system may transmit the stored input data to the DUT in response to receiving the triggering edge of the second clock cycle. In some embodiments, the emulation system may transmit the stored input data immediately or almost immediately after receiving the triggering edge of the second clock cycle. That is, the emulation system may not insert a delay between receiving the triggering edge of the second clock cycle and transmitting the stored data. Therefore, the DUT may receive the stored input data during the second clock cycle. From the perspective of the DUT, the data may be received with a shorter latency.

In some embodiments, the emulation may not transmit the stored input data to the DUT immediately after receiving the triggering edge of the second clock cycle. Rather, the emulation system may delay transmitting the data such that the DUT may receive the data during a third clock cycle following the second clock cycle. By doing so, the emulation system may control the timing of the data within the third clock cycle. For example, the emulation system may implement a preprogrammed delay such that the data arrives early during the third clock cycle. The delay may be based upon the duration of the first, second, and third clock cycles.

Figure 3:
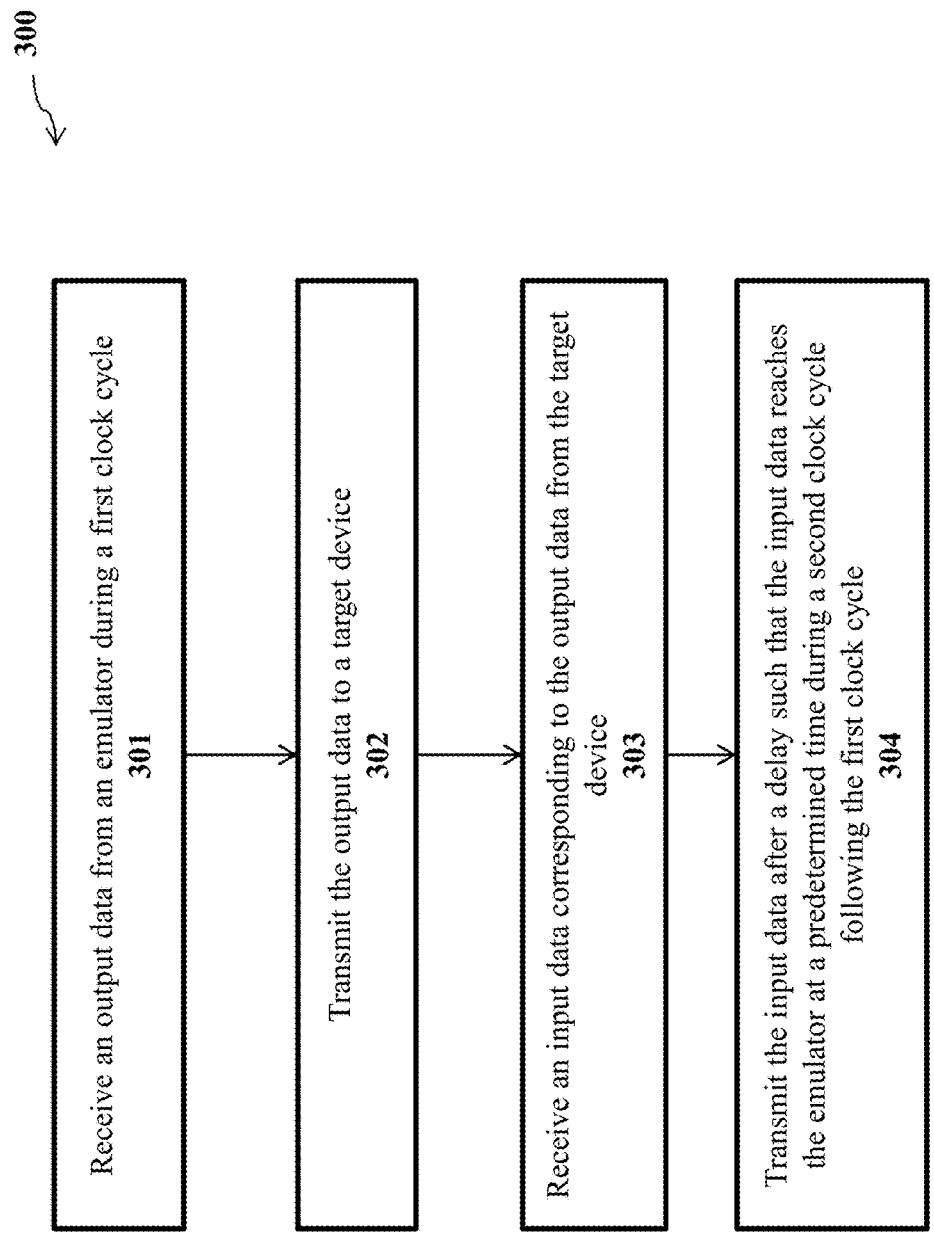
FIG. 3 illustrates an exemplary emulation method, according to an exemplary embodiment.

FIG. 3 shows an exemplary method 300 of reducing latency in an emulation system, according to an exemplary embodiment. One or more components within an emulation system may implement one or more steps of the method 300. For example, a target timing domain interfacing component (TTD) may implement the method 300, and for brevity, the following description details the TTD implementing the method 300, although other components of the emulation system may implement the method 300. The TTD may include one or more domains of one or more emulator devices in the emulations system. The TTD may use a field programmable gate array (FPGA) to receive and store the data. The FPGA may include both synchronous and asynchronous logic devices. For example, a TTD FPGA may include combinational logic gates and memory registers. FPGAs are known in the art and will not be described in detail here. Furthermore, the TTD FPGA is merely exemplary, and any device capable of receiving and providing storage and retrieval of data should be considered to be within the scope of this disclosure. In some embodiments, the TTD may use a first-in first-out (FIFO) queue to receive and store the input data.

The emulation system may contain an emulator that may interface with a target device through one or more connections such as an optical interconnect. The target device may transmit data to and receive data from a device under test (DUT) within the emulator. The target device may include one or more components that are configured to be connected to and interact with the DUT. For example, if the DUT is a central processing unit (CPU), the target device may be a motherboard that will receive the fabricated CPU containing the logic being emulated by the emulator. In the following description, the data transmitted by the target device to the emulator is referred as an input data and the data transmitted by the emulator to the target device is referred to as an output data.

In the first step 301, the TTD may receive an output data from an emulator during a first clock cycle. The output data may be generated by a DUT being tested and verified in the emulator. The DUT may generate the output data in response to receiving an input data from the target device. The output data may include control signals and/or data records. The first clock cycle may be a clock cycle of an interface clock of the emulation system. The interface clock may be used by the emulation system to transmit output to and receive input from the target device. In some instances, the first clock cycle may be a clock cycle of a clock among one or more internal clocks of the emulation system. Furthermore, the interface clock cycle may be based upon the base clock cycle of the emulation system.

In a next step 302, the TTD may transmit the output data to the target device. The TTD may transmit the output data to the target device within the first clock cycle as soon as the TTD receives the output data from the emulator.

In a next step 303, the TTD may receive an input data corresponding to the output data from the target device. The input data may include control signals and/or database records generated by the target device based upon the input data. For example, if the output data is a retrieval request of a data record at a particular location in memory, the output data may include the requested data record.

In a next step 304, the TTD may transmit the input data to the emulator such that that the input data reaches the emulator at a predetermined time during a second clock cycle following the first clock cycle. For example, the TTD may transmit the input data with a preprogrammed delay such that the input data arrives at the emulator early during the second clock cycle. To insert the delay, the TTD may temporarily store the input data in a FIFO queue within the TTD. As the input data is available early in the second clock cycle, the emulator may experience a minimal amount of latency. In other words, from the perspective of the emulator the RTCD is significantly reduced, as the delay seen by the emulator now includes only the analogue delay of transmitting the data from the TTD to the emulator, and the digital delay of the clock cycle may be ignored. Furthermore, the TTD can adjust the delay such that the input data shows up at the emulator at the very beginning of the second clock cycle. In this case, the emulator would not experience a delay (zero delay) of the transmission from the TTD to the emulator. Therefore, the delay of transmitting data from the TTD to the emulator may be tuned out completely.

In some instances, the aforementioned delay may be preprogrammed based upon the duration of the first clock cycle and/or the second clock cycle. In other instances, the emulation system may determine the delay during the compile time of the design being tested in the emulator. Furthermore, the emulation system may dynamically adjust the delay during the runtime of the emulation. In some instances, the delay can be manually adjusted by a user through a user interface.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for emulating hardware logic, the method comprising:
   receiving, by a set of one or more chips of an emulation system, an input data for an emulator from a target device during a first clock cycle, wherein the set of one or more chips defines a target timing domain interfacing component (TTD);
   storing, by the set of one or more chips of the TTD, the input data in a non-transitory storage medium;
   receiving, by the set of one or more chips of the TTD, the triggering edge of a second clock cycle, wherein the second clock cycle is after the first clock cycle; and
   transmitting, by the set of one more chips of the TTD, the input data to the emulator in response to receiving the triggering edge of the second clock cycle.

2. The method of claim 1, further comprising:
   transmitting, by the set of one or more chips of the TTD, the input data to the emulator immediately or almost immediately in response to receiving the triggering edge of the second clock cycle.

3. The method of claim 2, further comprising:
   receiving, by the emulator, the input data within the second clock cycle.

4. The method of claim 1, further comprising:
   transmitting, by set of one or more chips of the TTD, the input data to the emulator after a delay in response to receiving the triggering edge of the second clock cycle.

5. The method of claim 4, further comprising:
   receiving, by the emulator, the input data at a predetermined time within a third clock cycle following the second clock cycle.

6. The method of claim 4, wherein the delay is preprogrammed based upon the duration of the first clock cycle or the second clock cycle.

7. The method of claim 1, wherein the TTD includes a field programmable gate array (FPGA) configured to store the input data.

8. The method of claim 1, further comprising:
   receiving, by a target pod the emulation system, the output data transmitted by the TTD;
   transmitting, by the target pod, the output data to the target device;
   receiving, by the target pod, the input data from the target device; and
   transmitting, by the target pod, the input data to the TTD.

9. A method for emulating hardware logic, the method comprising:
   receiving, by a set of one or more chips of an emulation system, an output data for a target device from an emulator during a first clock cycle, wherein the set of one or more chips defines a target timing domain interfacing component (TTD);
   transmitting, by the set of one or more chips of the TTD, the output data to the target device;
   receiving, by the set of one or more chips of the TTD, from the target device an input data for the emulator generated by the target in response to the input data; and
   transmitting, by the set of one or more chips of the TTD, the input data after a delay such that the emulator receives the input data during a predetermined time during a second clock cycle, wherein the second clock cycle is after the first clock cycle.

10. The method of claim 9, wherein the delay is preprogrammed based upon the duration of the first clock cycle or the second clock cycle.

11. The method of claim 9, wherein the delay is preprogrammed such that the input data reaches the emulator early in the second clock cycle.

12. The method of claim 9, wherein the TTD includes a field programmable gate array (FPGA) configured to store the input data.

13. The method of claim 9, further comprising:
   storing, by the set of one or more chips of the TTD, the input data in a non-transitory storage medium.

14. The method of claim 9, wherein the first clock cycle and the second clock cycles are associated with an interface clock of the emulation system, wherein the interface clock is used by the emulation system to control transmitting the output data to and receiving the input data from the target device.

15. A system for emulating hardware logic, the system comprising:
- a plurality of processors, at least a portion of plurality of processors configured to emulate hardware logic of a device under test (DUT); and
- a set of one or more chips defining a target timing domain interfacing component (TTD), the TTD configured to:
  - receive an output data for a target device from the emulator;
  - transmit the output data to the target device;
  - receive an input data for the emulator generated by the target device in response to the output data;
  - store the input data in a first-in first-out (FIFO) queue; and
  - transmit the input data to the emulator after a delay or in response to receiving a triggering edge of a clock cycle from the emulator.

16. The system of claim 15, wherein the TTD is configured to receive the input data from the target during a preceding clock cycle.

17. The system of claim 15, wherein the TTD is configured to receive the output data from the emulator during a first clock cycle and further configured to transmit the input data to the emulator after a predetermined delay such that the emulator receives the input data at a predetermined during a second clock cycle subsequent to the first clock cycle.

18. The system of claim 17, wherein the delay is based upon the duration of the first clock cycle or the second clock cycle.

19. The system of claim 18, wherein the delay is preprogrammed such that the input data reaches the emulator early in the second clock cycle.

20. The system of claim 15, wherein the clock cycle is associated with an interface clock of the emulation system, wherein the interface clock is used by the emulation system to control transmitting data to and receiving data from the target device.

* * * * *